(12) United States Patent
Wellhoefer et al.

(10) Patent No.: US 8,818,638 B2
(45) Date of Patent: Aug. 26, 2014

(54) DEVICE AND METHOD FOR TRIGGERING PASSENGER PROTECTION MEANS

(75) Inventors: Matthias Wellhoefer, Stuttgart (DE); Volker Frese, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 691 days.

(21) Appl. No.: 12/596,668

(22) PCT Filed: Feb. 25, 2008

(86) PCT No.: PCT/EP2008/052252
§ 371 (c)(1),
(2), (4) Date: Mar. 11, 2010

(87) PCT Pub. No.: WO2008/128810
PCT Pub. Date: Oct. 30, 2008

(65) Prior Publication Data
US 2010/0191424 A1 Jul. 29, 2010

(30) Foreign Application Priority Data
Apr. 19, 2007 (DE) .......... 10 2007 018 468

(51) Int. Cl.
*B60R 21/013* (2006.01)
*B60R 21/0132* (2006.01)
*B60R 21/01* (2006.01)

(52) U.S. Cl.
CPC ....... *B60R 21/013* (2013.01); *B60R 2021/0119* (2013.01); *B60R 2021/01325* (2013.01); *B60R 2021/01327* (2013.01); *B60R 21/0132* (2013.01)
USPC .......................................... 701/45

(58) Field of Classification Search
USPC ........................................... 701/45
See application file for complete search history.

(56) References Cited

U.S. PATENT DOCUMENTS

| | | | | |
|---|---|---|---|---|
| 4,862,091 | A * | 8/1989 | Hillebrand | 324/415 |
| 5,493,270 | A * | 2/1996 | Kondo | 340/438 |
| 5,650,698 | A * | 7/1997 | Ito et al. | 318/282 |
| 5,809,439 | A * | 9/1998 | Damisch | 701/45 |
| 2004/0032322 | A1* | 2/2004 | Kocher et al. | 340/436 |

FOREIGN PATENT DOCUMENTS

| | | |
|---|---|---|
| CN | 101652273 | 2/2010 |
| DE | 10230485 | 1/2004 |
| DE | 102004057689 A1 | 6/2006 |
| DE | 102005044768 A1 | 4/2007 |
| EP | 1710133 A | 10/2006 |
| EP | 1710133 A2 * | 10/2006 |
| WO | WO 02/092395 A | 11/2002 |

\* cited by examiner

*Primary Examiner* — Shelley Chen
(74) *Attorney, Agent, or Firm* — Kenyon & Kenyon LLP

(57) ABSTRACT

A device and a method for triggering passenger protection means as a function of signals of a sensor module is provided. For example, the sensor module includes at least two sensors which are accommodated in one housing. The signal conditioning for the at least two sensors takes place on separate hardware paths.

16 Claims, 4 Drawing Sheets

DEVICE AND METHOD FOR TRIGGERING PASSENGER PROTECTION MEANS

CROSS-REFERENCE TO RELATED APPLICATION(S)

The present application claims priority to German Patent Application No. 102007018468.0, filed in the Federal Republic of Germany on Apr. 19, 2007, which is expressly incorporated herein in its entirety by reference thereto.

FIELD OF INVENTION

The present invention relates to a device and a method for triggering passenger protection.

BACKGROUND INFORMATION

A device for passenger protection is described in German Patent Reference No. DE 102 30 485 A1, in which the plausibility of a first sensor signal is checked using a second sensor signal, the plausibility being carried out by an additional sensor in comparison to the generation of the first sensor signal.

SUMMARY

Embodiments of the present invention provide a device and method for triggering passenger protection devices/methods in which a sensor module has at least two sensors that are located in one housing, and a signal conditioning for the at least two sensors takes place on separate hardware paths. In embodiments of the present invention, one can counteract a so-called common-mode error. A so-called common-mode error is an error that equally impairs both the first and the plausibilizing sensor. Such an error could trigger a faulty action. However, in embodiments of the present invention, the different hardware paths make it possible for the at least two sensors to be located in one sensor module in one housing, and even on one integrated circuit. In embodiments of the present invention, it is possible for two separate substrates to be present in the one housing. This allows for significant surface and cost savings compared to spatially separated sensors that must have separate housings.

In the present context, passenger protection means include airbags, belt tensioning devices, crash-active headrests, and also active passenger protection means such as brakes and a vehicle dynamics control. Other passenger protection devices/methods not mentioned here may also be triggered according to the present invention.

In the present context, the sensor modules are a structural unit having a single housing in which the at least two sensors are located. For example, this may be an integrated circuit. The sensor module may be located inside or outside of a control device. For example, the sensor module may be expanded into a sensor cluster. For example, the sensors are acceleration sensors and/or rotation-rate sensors. The signal conditioning has, for example, analog and digital signal conditioning parts, to condition the actual sensor signal for the transmission to the control device or to an evaluation circuit.

In embodiments of the present invention, the separate hardware paths are physically separated from one another, i.e., the hardware paths do not have any shared elements through which the signals of both hardware paths run. In embodiments of the present invention, the signals may be merged at the end. Then, these hardware paths end. In embodiments of the present invention, connections between the hardware paths are also possible, but without the signals being extracted.

An evaluation circuit, which is normally located in the control device, is a circuit that generates a trigger signal for the passenger protection means as a function of the sensor signals. This trigger signal is then normally used by a trigger circuit to trigger the passenger protection means. For example, typically, a microcontroller or another processor type is chosen as a trigger circuit. However, user-specific integrated circuits or even discrete evaluation circuits are also possible.

In embodiments of the present invention, in the respective hardware path, an analog-digital conversion is provided, the analog-digital conversion operating at different frequencies in the respective hardware paths. In embodiments, the digital/analog converter and the digital filters require a time base, which also applies to analog filters in the so-called switched capacitor technology. In embodiments, this time base must either be generated in the sensor or supplied from outside. In embodiments, an error in the time base automatically leads to an error in the signal.

In embodiments of the present invention, a respective pulse is generated for the respective sensor. For example, in rotation-rate sensors, the pulse is generated via the characteristic frequency of this sensor itself, since rotation rates may be determined by a Coriolis acceleration in vibration systems. In embodiments, such a pulse generation is possible in plausibilizing acceleration sensors. In this instance, the pulse may be supplied from outside, for example, by the microcontroller in the control device, or be generated internally by an electronic oscillator.

In embodiments of the present invention, a first hardware path monitors the pulse of a second hardware path. The hardware paths and specially developed monitoring circuits may perform a reciprocal monitoring with respect to the pulses. For example, in the case at hand, two counters, which count the respective pulses, are compared with one another and tested for a fixed ratio.

In embodiments of the present invention, a respective voltage supply is provided for each hardware path. That is, a voltage supply exists for each hardware path. For example, this voltage supply is executed by an integrated circuit. In embodiments, this integrated circuit receives the battery voltage and converts the battery voltage into the voltages required for the hardware path.

In embodiments of the present invention, the first hardware path monitors the voltage supply of the second hardware path. In this instance, a crosswise monitoring of the hardware paths is achieved, so that a high degree of reliability is ensured.

In an embodiment, the hardware paths may ultimately be connected in a communication interface. This communication interface may be a current interface, for example, in which the data are superposed on a closed-circuit current. This current interface is preferably designed in a unidirectional manner, so that data may be transmitted in one direction only. Such a current interface is provided by the applicant as PSI5. A further example of a possibility for implementing the communication interface is the SPI (serial peripheral interface) transmission, which allows for a transmission between a master and one or multiple slaves in a control device.

In embodiments of the present invention, the communication interface is implemented in a redundant manner. A communication logic (PSI5, SPI) is provided in the sensor. This communication logic transmits the data from an internal memory in accordance with the required protocol. According to an embodiment of the present invention, this communication logic is doubled and modified in such a manner that the second communication logic has its own addressing, for example. In an embodiment, if this is not possible, as in current interface PSI5, for example, then the second communication logic must analyze the data flow of the first communication logic and compare it to the data to be sent.

In embodiments of the present invention, a plausibilization device is provided that compares the signals of the sensor module to plausibilization signals of at least one additional sensor and influences the triggering as a function of this comparison. Thus, a redundancy is accordingly created with regard to the sensor system, which also differs in terms of location, and use is made of the fact that a multitude of sensors may be present in a vehicle due to the coexistence of a vehicle dynamics control system and an airbag system. For example, the ESP sensor module and an ROSE sensor module for detecting a roll-over event may be compared to each other in terms of their data in order to produce a plausibilization. To increase the robustness against the common-mode error, at least one sensing channel of a shared rotation-rate acceleration sensor module may be plausibilized by a redundant sensor in the vehicle through comparison. In an embodiment, in a shared cluster module, one can plausibilize separately as many sensor elements as possible, for example, all of those required.

In embodiments of the present invention, for a roll-over functionality, that is, a roll-over detection, with the corresponding equipment, one can plausibilize all three required variables using redundant sensor systems, as may be seen below:

The rotation-rate sensor is plausibilized by a rotation-rate sensor of the active damper control and/or by a rotation-rate sensor in the ESP. A so-called low-g acceleration sensor in the transverse direction of the vehicle, that is, Y direction, is plausibilized by a low-g-y of the ESP system. A low-g acceleration sensor in the Z direction is plausibilized by low-g-Z from the chassis control section for the suspension control.

BRIEF DESCRIPTION OF THE DRAWINGS

Exemplary embodiments of the present invention are illustrated in the drawings and explained in greater detail in the following description.

DETAILED DESCRIPTION

Figure 1:
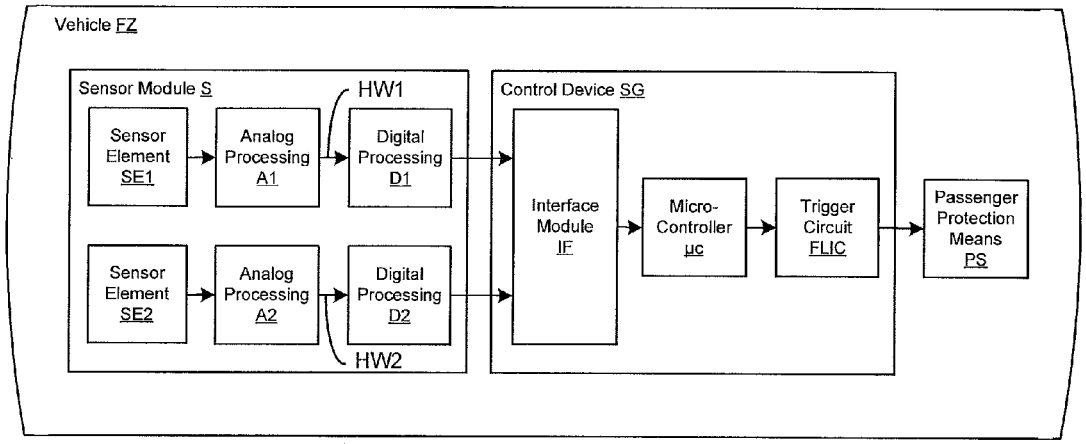
FIG. 1 shows a block diagram of an embodiment device according to the present invention.

FIG. 1 shows a device according to an embodiment of the present invention in a vehicle FZ. A sensor module S has two sensors respectively made up of one sensor element SE1 or SE2, one analog processing A1 or A2, and one digital processing D1 or D2 of the sensor signals. The two sensors have different hardware paths HW1 and HW2, so that the signals of the sensor elements SE1 and SE2 do not run through shared elements even after the processing. According to embodiments of the present invention, this is to avoid what a so-called common-mode error. The hardware paths are connected to an interface module IF in a control device SG for triggering passenger protection means PS. In control device SG, the sensor signals are transmitted via an internal bus, for example, the so-called SPI (serial peripheral interface bus), to an evaluation circuit, in this instance to a microcontroller µC.

Microcontroller µC evaluates the signals in a known way, in order to decide whether passenger protection means PS are to be triggered or not. To this end, microcontroller µC loads its evaluation algorithm from a memory that is not illustrated in this instance. In this instance, only the elements that are needed to appropriately illustrate an embodiment of the present invention are shown. Other elements necessary for operation are omitted for the sake of simplicity.

In embodiments of the present invention, if microcontroller µC arrives at the conclusion that passenger protection means PS are to be triggered, then microcontroller µC transmits a trigger signal, again via the SPI bus, to trigger circuit FLIC. Trigger circuit FLIC is one or multiple ICs, which, for example, have at least two circuit breakers that are closed as a function of the trigger signal and lead to an activation of the passenger protection means. In an embodiment, the trigger circuit FLIC can be structured discretely or from multiple ICs. In an embodiment, interface IF is designed as hardware and/or software.

Figure 2:
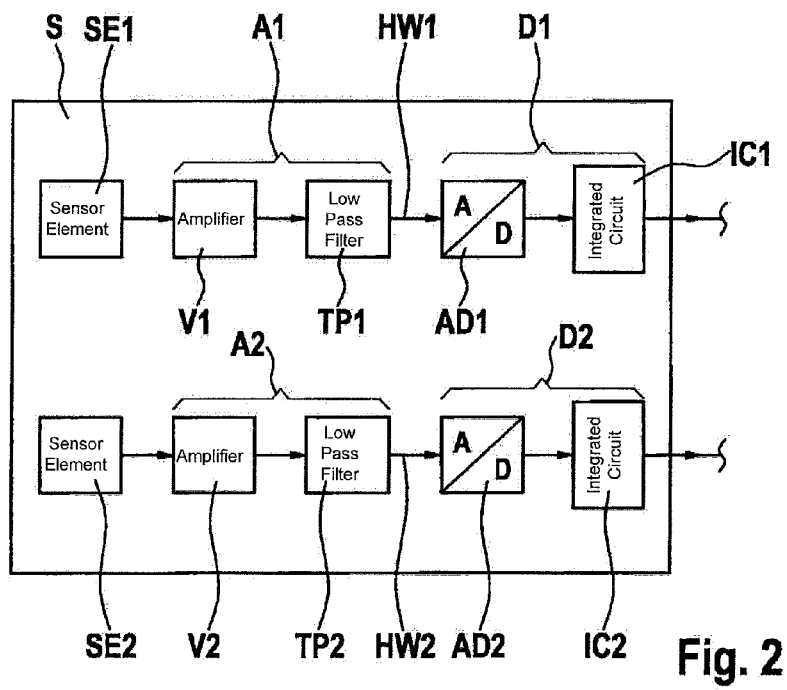
FIG. 2 shows a block diagram of an embodiment of a sensor module according to the present invention.

FIG. 2 shows a block diagram of an embodiment of sensor module S. Upper hardware path HW1 is shown having sensor element SE1 and, as analog processor A1, an amplifier V1 having a downstream low pass filter TP1. In this embodiment, alternatives for the filter and the amplifier may also be used. The sequence may also be changed.

Hardware path HW1 has digital part D1, which is made up of an analog-digital converter AD1 and an integrated circuit IC1. The analog-digital converter digitalizes the sensor signals that were processed in an analog manner by A1. Integrated circuit IC1 performs an additional signal conditioning and transmits the sensor data to interface IF1 in a predefined format.

The components of hardware path HW2 have the same functions, hardware path HW2 including a sensor element SE2, an analog part A2 having an amplifier V2 and a low-pass filter TP2, and a digital part D2 having an analog-digital converter AD2 and an IC2.

In embodiments, instead of only one IC, there can be multiple ICs used. In embodiments, a processor can be used.

Figure 3:
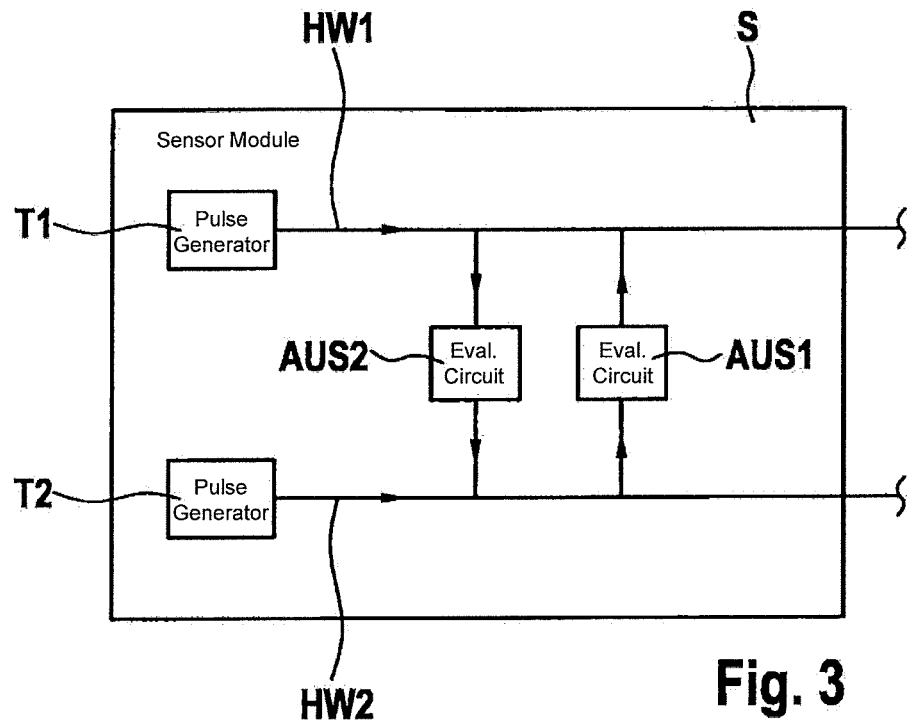
FIG. 3 shows a block diagram of an embodiment of a sensor module according to the present invention.

FIG. 3 shows a block diagram of an embodiment of a sensor module S. For the sake of simplicity, only pulse generators T1 and T2 of the respective hardware paths HW1 and HW2 are shown in this instance. In an embodiment, pulse generator T1 is an electronic oscillating circuit on the basis of an RC element or a quartz. In an embodiment, pulse generator T2 is based on the resonant frequency of the micromechanical oscillator. However, now links between hardware paths HW1 and HW2 are provided, to wit, the evaluation circuits aus 1 and aus 2. The evaluation circuit aus 1 evaluates the pulse in hardware path HW2. The evaluation circuit aus 2 evaluates the pulse of pulse generator T1. Thus, a crosswise monitoring is possible. In an embodiment, pulses T1 and T2 are different so that they also counteract a common-mode error. Counter Z1 is based on pulse generator T1, and counter Z2 is correspondingly based on pulse generator T2. If Z1 has reached a predefined value, a logic controls counter Z2 within fixed limits with regard to its counter reading. Afterward, counters Z1 and Z2 are reset to zero. Thus, both counters may be monitored continually.

Figure 4:
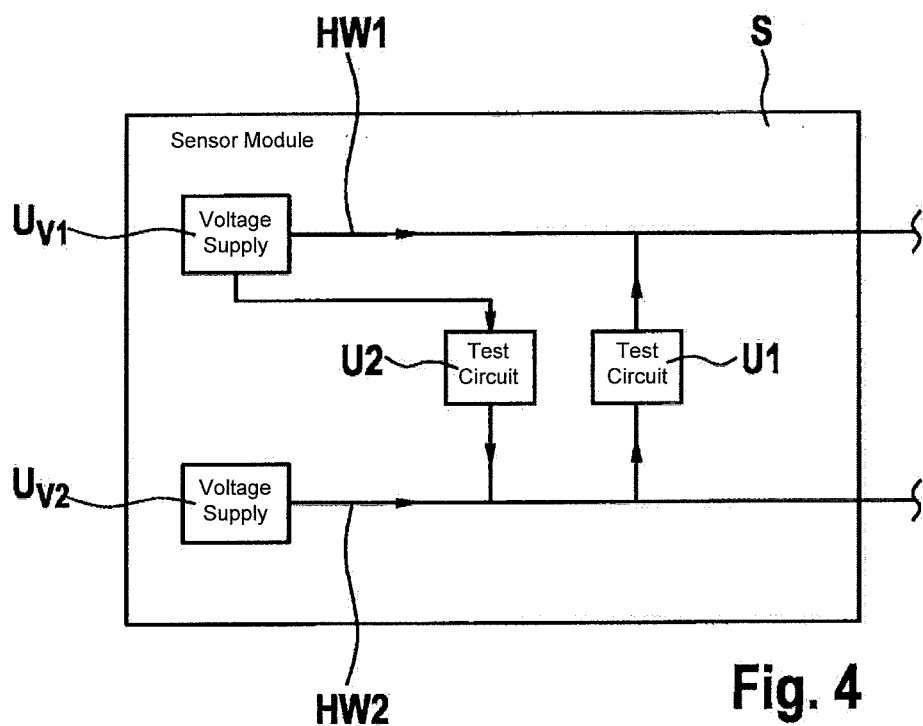
FIG. 4 shows a block diagram of an embodiment of a sensor module according to the present invention.

FIG. 4 shows a simplified block diagram of an embodiment of a sensor module S. In this embodiment, the two hardware paths HW1 and HW2 have different voltage supplies UV1 and UV2, respectively. A crosswise test is performed, for example, by circuits U1 and U2.

In an embodiment, in the event of an error, the crosswise tests illustrated in the embodiments of FIGS. 3 and 4 result in a corresponding message, which is transmitted to control device SG via the data lines.

Figure 5:
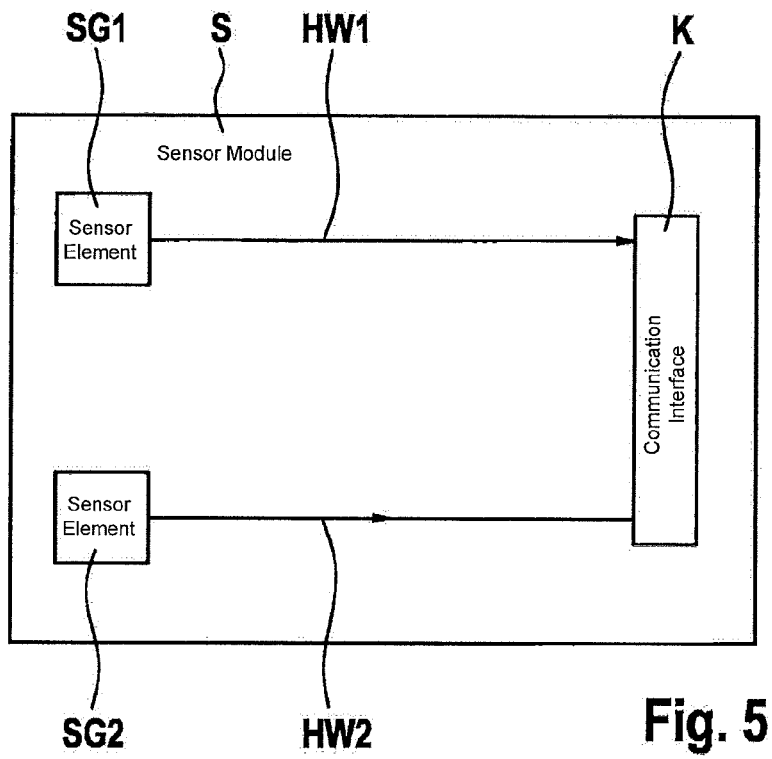
FIG. 5 shows a block diagram of an embodiment of a sensor module according to the present invention.

FIG. 5 shows a simplified block diagram of sensor module S according to the present invention. In this instance, hardware paths HW1 and HW2 for sensor elements SE1 and SE2 are connected to a communication interface K, which may be designed as specified above. Thus, the hardware paths are already reunited in sensor module S.

Figure 6:
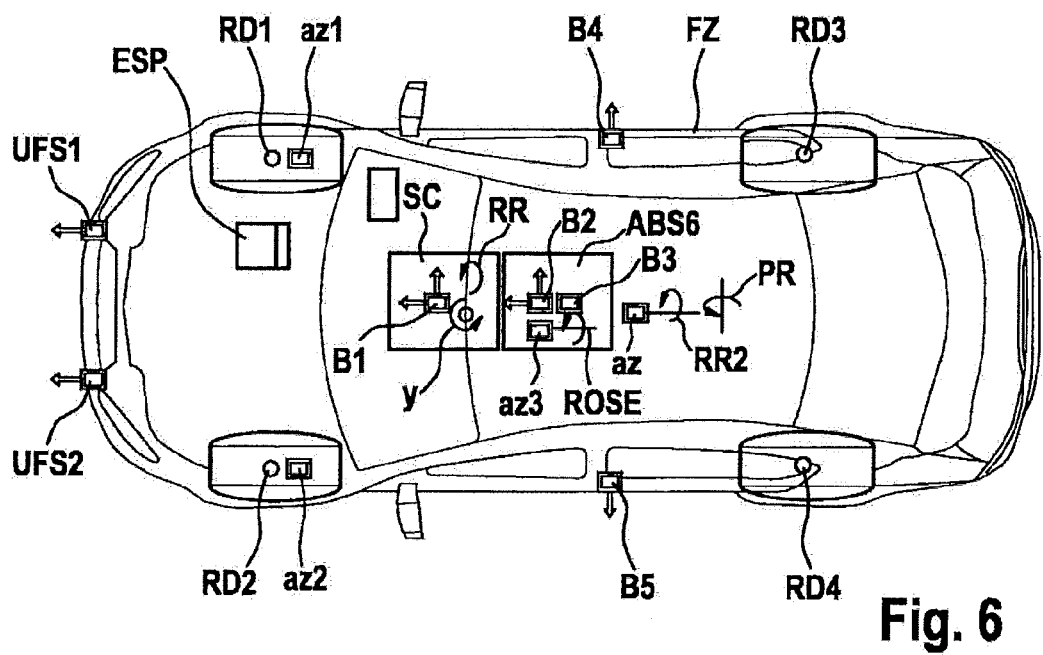
FIG. 6 shows an embodiment of a sensor distribution in a vehicle.

FIG. 6 shows an embodiment of different sensors that allow for a reciprocal plausibilization. In vehicle FZ, there are wheel speed sensors RD1 through 4 together with the vertically oriented acceleration sensors az1 and az2. In an embodiment, a rotation around the vehicle's vertical axis is ascertained from the signals of the of the wheel speed sensors RD1 through 4. This may be used to plausibilize the measuring signal of a corresponding rotation-rate sensor that measures the rotation around the vehicle's vertical axis.

In an embodiment, the vertically oriented acceleration sensors az1 and az2 are used to plausibilize acceleration sensor az3 disposed in airbag control device ABSG, for example, which is also oriented in the direction of the vehicle's vertical axis with regard to its sensitivity, as well as sensor az.

In an embodiment, acceleration sensors B1 in sensor cluster SC and B2 in airbag control device ABSG is plausibilized with regard to the vehicle's longitudinal direction by upfront sensors UFS1 and UFS2. In an embodiment, in the vehicle's transverse direction, acceleration sensors B1 and B2 are plausibilized by sensors B4 and B5, which are built into the vehicle sides and are oriented in the vehicle's transverse direction. In an embodiment, with regard to its sensor system, the ESP control device is plausibilized by the existing sensors in this instance, as well as the ROSE sensor system for detecting roll-over, which measures the rotation around the vehicle's longitudinal and transverse axis; using the roll rate sensing RR and RR2 and the so-called pitch-rate sensing PR, for example. In an embodiment, acceleration sensor B3 is plausibilized by upfront sensors UFS1 and UFS2 or acceleration sensors B1 and B2. In an embodiment, yaw rate sensor y in sensor cluster SC is plausibilized by wheel speed sensors RD1-4, for example.

It is thus demonstrated that there is a multitude of possibilities for reciprocal plausibilization in the motor vehicle.

Figure 7:
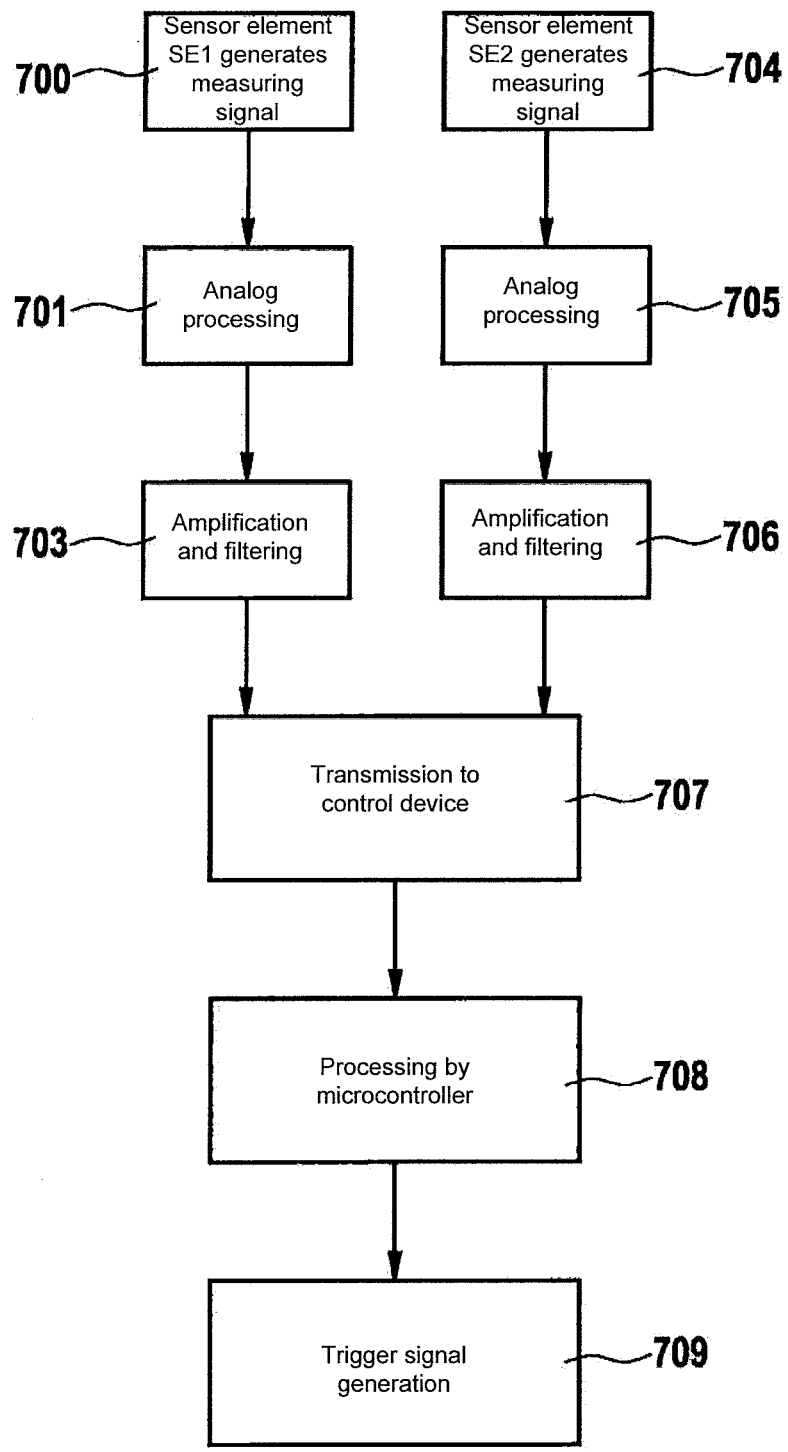
FIG. 7 shows a flow chart of an embodiment method according to the present invention.

FIG. 7 shows an embodiment method according to the present invention. The processing runs parallel in two strands on the different hardware paths HW1 and HW2. In method step 700 in hardware path HW1, sensor element SE1, which is implemented micromechanically, generates a measuring signal that undergoes analog processing in method step 701, an amplification and a filtering, for example. In method step 703, the digitalization and a preprocessing takes place, so that these data may then be transmitted. This also applies for the second hardware path, which runs through corresponding method steps 704, 705 and 706. In an embodiment, transmission 707 to control device SG occurs jointly or separately. In method step 708, the sensor signals are then processed by microcontroller μC, and the trigger signal is generated through method step 709.

In an embodiment, the sensor module is located inside of control device SG.

What is claimed is:

1. A device for triggering a passenger protection system, comprising:
    a sensor module including:
        first and second sensors in one housing;
        first and second separate hardware paths including respective signal conditioning circuits for the first and second sensors;
        a first monitoring circuit to monitor a first operating characteristic of the first hardware path; and
        a second monitoring circuit to monitor a second operating characteristic of the second hardware path, the monitored first and second operating characteristics being compared to each other; and
    an evaluation circuit, the evaluation circuit effecting the triggering of the passenger protection system upon receipt of signals from the sensor module;
    wherein the first operating characteristic is a first pulse count of a first pulse signal generated for the first sensor, and the second operating characteristic is a second pulse count of a second pulse signal generated for the second sensor.

2. The device as recited in claim 1, wherein the signal conditioning for each respective hardware path has an analog-digital conversion, which respectively operates at different frequencies.

3. The device as recited in claim 1, wherein the first and second monitoring circuits compare the first and second pulse counts to determine whether a ratio of the first pulse count to the second pulse count has a predetermined value.

4. The device as recited in claim 1, wherein for each hardware path a respective voltage supply is provided.

5. A device for triggering a passenger protection system, comprising:
    a sensor module including:
        first and second sensors in one housing;
        first and second separate hardware paths including respective signal conditioning circuits for the first and second sensors;
        a first monitoring circuit to monitor a first operating characteristic of the first hardware path; and
        a second monitoring circuit to monitor a second operating characteristic of the second hardware path, the monitored first and second operating characteristics being compared to each other; and
    an evaluation circuit, the evaluation circuit effecting the triggering of the passenger protection system upon receipt of signals from the sensor module;
    wherein the first monitoring circuit is connected to the first and second hardware paths to monitor a first voltage supply of the first hardware path, and the second monitoring circuit is connected to the first and second hardware paths to monitor a second voltage supply of the second hardware path, and wherein the first operating characteristic is a first pulse count of a first pulse signal generated for the first sensor, and the second operating characteristic is a second pulse count of a second pulse signal generated for the second sensor.

6. The device as recited in claim 1, wherein the respective hardware paths are connected in a communication interface.

7. The device as recited in claim 6, wherein the communication interface is executed in a redundant manner.

8. The device as recited in claim 1, wherein a plausibilization device is provided that compares the signals of the sensor module to plausibilization signals of at least one additional sensor and influences the triggering as a function of this comparison.

9. A method for a triggering passenger protection system, comprising:
    signaling by a sensor module to trigger the passenger protection system, wherein the sensor module includes:
        first and second sensors in a single housing;
        first and second separate hardware paths including signal conditioning circuits respectively for the first and second sensors;
        a first monitoring circuit to monitor a first operating characteristic of the first hardware path; and
        a second monitoring circuit to monitor a second operating characteristic of the second hardware path, the monitored first and second operating characteristics being compared to each other; and
    generating a first pulse signal for the first sensor and a second pulse signal for the second sensor, wherein the first operating characteristic is a first pulse count of the first pulse signal and the second operating characteristic is a second pulse count of the second pulse signal.

10. The method of claim 9, wherein the signal conditioning conditions the signal of the sensor module for transmission to an evaluation circuit.

11. The method of claim 10, further comprising:
    generating by the evaluation circuit a trigger signal for the passenger protection system as a function of the signal of the sensor module.

12. The method of claim 11, further comprising:
    triggering the passenger protection system by a trigger circuit upon receiving the trigger signal.

13. The method of claim 9, further comprising:
    performing an analog-to-digital conversion as part of signal conditioning for each respective hardware path, wherein the respective analog-digital conversions operate at different frequencies.

14. The method of claim 9, wherein the monitoring and comparing is to determine whether a ratio of the first pulse count to the second pulse count has a predetermined value.

15. The method of claim 9, further comprising:
    providing for each hardware path a respective voltage supply.

16. A method for a triggering passenger protection system, comprising:
    signaling by a sensor module to trigger the passenger protection system;
    wherein:
        the sensor module includes:
            first and second sensors in a single housing;
            first and second separate hardware paths including signal conditioning circuits respectively for the first and second sensors;
            a first monitoring circuit to monitor a first operating characteristic of the first hardware path; and
            a second monitoring circuit to monitor a second operating characteristic of the second hardware path, the monitored first and second operating characteristics being compared to each other; and
        the first monitoring circuit is connected to the first and second hardware paths to monitor a first voltage supply of the first hardware path, and the second monitoring circuit is connected to the first and second hardware paths to monitor a second voltage supply of the second hardware path; and the first operating characteristic is a first pulse count of a first pulse signal generated for the first sensor, and the second operating characteristic is a second pulse count of a second pulse signal generated for the second sensor.

* * * * *